United States Patent
Yamamoto et al.

(10) Patent No.: US 9,373,350 B2
(45) Date of Patent: Jun. 21, 2016

(54) OPTICAL MEDIUM REPRODUCING APPARATUS AND OPTICAL MEDIUM REPRODUCING METHOD

(71) Applicant: Sony Corporation, Tokyo (JP)

(72) Inventors: Kenji Yamamoto, Kanagawa (JP); Takashi Nakao, Tokyo (JP); Kimihiro Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/278,735

(22) Filed: May 15, 2014

(65) Prior Publication Data

US 2014/0355404 A1    Dec. 4, 2014

(30) Foreign Application Priority Data

May 28, 2013   (JP) ................. 2013-111740

(51) Int. Cl.
*G11B 20/10*   (2006.01)
*G11B 7/005*   (2006.01)
(Continued)

(52) U.S. Cl.
CPC ............. *G11B 7/005* (2013.01); *G11B 7/135* (2013.01); *G11B 7/1369* (2013.01); *G11B 7/1374* (2013.01); *G11B 7/1376* (2013.01); *G11B 7/1381* (2013.01); *G11B 7/1395* (2013.01); *G11B 7/1398* (2013.01); *G11B 20/10009* (2013.01)

(58) Field of Classification Search
CPC ........... G11B 11/10532; G11B 7/1381; G11B 7/135; G11B 7/1353; G11B 7/1369; G11B 7/13922; G11B 7/1398; G11B 2007/0013; G11B 2007/0006; G11B 7/0901; G11B 7/131; G11B 7/1356; G11B 7/0909; G11B 7/123; G11B 11/10508; G11B 11/1051; G11B 11/0532; G11B 11/10545; G11B 11/10586; G11B 17/0434; G11B 20/10009; G11B 20/10212; G11B 7/0037; G11B 7/0065; G11B 7/08505; G11B 7/08523; G11B 7/09; G11B 7/0912; G11B 7/0933; G11B 7/0935; G11B 7/0938; G11B 7/094; G11B 7/133; G11B 7/1362; G11B 7/1374; G11B 7/139; G11B 7/1392; G11B 7/22; G02B 6/4214; G02B 6/4246; G02B 2006/12104; G02B 26/02; G02B 26/0841; G02B 6/32; G02B 6/3518; G02B 6/3556; G02B 6/357; G02B 6/3584; G02B 6/359; G02B 6/4226; G02B 6/4249
USPC .......... 369/44.32, 53.33, 47.17, 44.23, 44.24, 369/44.41, 53.12, 53.16, 53.18, 53.27, 369/53.42
See application file for complete search history.

(56) References Cited

U.S. PATENT DOCUMENTS

| | | | | |
|---|---|---|---|---|
| 5,206,852 A | * | 4/1993 | Kim et al. | ............... 369/112.18 |
| 5,621,717 A | * | 4/1997 | Finkelstein | .......... G11B 7/0037 369/112.16 |
| 6,243,326 B1 | * | 6/2001 | Sumi | ................. G11B 11/1051 369/124.01 |

(Continued)

FOREIGN PATENT DOCUMENTS

JP    2012-079385    4/2012

*Primary Examiner* — Dionne H Pendleton
(74) *Attorney, Agent, or Firm* — K&L Gates LLP

(57) ABSTRACT

An optical medium reproducing apparatus that optically reproduces an optical medium on which a plurality of tracks is formed in which a beam returning from the optical medium is divided into a first region of an outside portion and a second region of an inside region, according to the shape of the pupil of an object lens, and crosstalk between the tracks is reduced by using a first detection signal of the first region and a second detection signal of the second region.

28 Claims, 17 Drawing Sheets

(51) Int. Cl.
*G11B 7/1395* (2012.01)
*G11B 7/1398* (2012.01)
*G11B 7/135* (2012.01)
*G11B 7/1374* (2012.01)
*G11B 7/1376* (2012.01)
*G11B 7/1369* (2012.01)
*G11B 7/1381* (2012.01)

(56) References Cited

U.S. PATENT DOCUMENTS 6,370,092 B1 * 4/2002 Araki et al. ................. 369/44.23
6,574,183 B2 * 6/2003 Dang ................... G11B 7/1381
 369/112.28
2011/0276989 A1 * 11/2011 Takahashi ............ G11B 7/1381
 720/695

* cited by examiner

OPTICAL MEDIUM REPRODUCING APPARATUS AND OPTICAL MEDIUM REPRODUCING METHOD

CROSS REFERENCES TO RELATED APPLICATIONS

The present application claims priority to Japanese Priority Patent Application JP 2013-111740 filed in the Japan Patent Office on May 28, 2013, the entire content of which is hereby incorporated by reference.

BACKGROUND

The present disclosure relates to an optical medium reproducing apparatus that reproduces an optical medium, such as an optical disc, and an optical reproducing method.

One method of increasing the density of an optical disc is to make the track pitch narrower. However, when the track pitch is made narrow, leaking of information from adjacent tracks (adjacent track crosstalk) increases. Methods that reduce adjacent track crosstalk (below, simply referred to as crosstalk, as appropriate) have been proposed.

For example, Japanese Unexamined Patent Application Publication No. 2012-079385 discloses supplying reproduction signals of a track that is a reproduction target and the tracks on both sides thereof to an adaptive equalizer unit, and canceling out the crosstalk by controlling the tap coefficient of the adaptive equalizer unit.

SUMMARY

The disclosure of Japanese Unexamined Patent Application Publication No. 2012-079385 reduces crosstalk by processing an electrical signal. Accordingly, three beams are necessary for reading the track that is the reproduction target and the tracks on both sides thereof. It is also possible for one beam to sequentially reproduce the three tracks and to synchronize the reproduction signals. Memory is necessary for the synchronization. In any case, an adaptive equalizer unit is necessary. Accordingly, the technology disclosed in Japanese Unexamined Patent Application Publication No. 2012-079385 has a problem in that the electrical configuration becomes complicated.

Accordingly, it is desirable to provide an optical medium reproducing apparatus and an optical reproducing method that are able to avoid complexity of the electrical configuration.

According to an embodiment of the present disclosure, there is provided an optical medium reproducing apparatus that optically reproduces an optical medium on which a plurality of tracks is formed, in which a beam returning from the optical medium is divided into a first region of an outside portion and a second region of an inside region, according to the shape of the pupil of an object lens, and reduces crosstalk between tracks by using a first detection signal of the first region and a second detection signal of the second region.

In the embodiment, it is preferable that the second region be rectangular or be elliptical or a similar shape in which the track direction is set as the longitudinal direction, and the longitudinal direction be shorter than the beam diameter.

According to the embodiment of the present disclosure, reproducing adjacent tracks other than the track that is the reproduction target is unnecessary, therefore it is possible to reproduce an optical medium with a single beam. Furthermore, continuously reproducing three tracks with one beam, and synchronizing with a memory are unnecessary, and it is possible to avoid an increase in the memory. Furthermore, controlling the tap coefficient of an adaptive equalizer unit is unnecessary, and it is possible for the electrical configuration and the processing to be simple.

Additional features and advantages are described herein, and will be apparent from the following Detailed Description and the figures.

DETAILED DESCRIPTION

The embodiments described below are favorable examples of the disclosure, and various preferable technological limits are applied thereto. However, the scope of the disclosure is not limited the embodiments, as long as there is no particular description to an effect limiting the disclosure in the description below.

Description of the disclosure will be made according to the order below.
1. First Embodiment
2. Second Embodiment
3. Modification Example

1. First Embodiment

Configuration of Optical Disc Apparatus and Optical Disc

Figure 1:
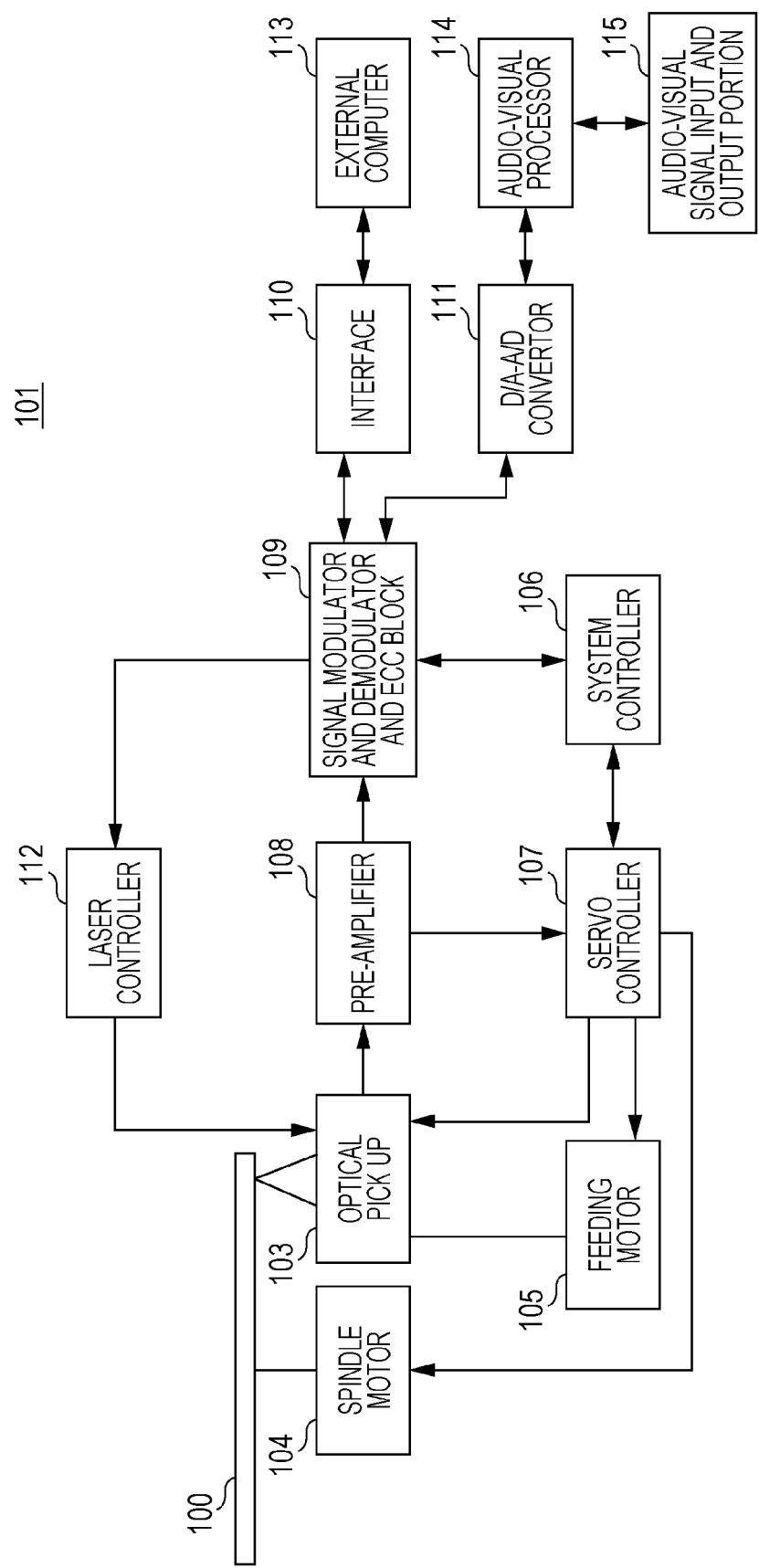
FIG. 1 is a block diagram showing a configuration of an optical disc apparatus according to a first embodiment of the disclosure.

An optical disc apparatus 101 to which the disclosure is applied includes, as shown in FIG. 1, an optical pick up 103 that performed recording and reproduction of information with respect to an optical disc 100 as an optical recording medium, and a spindle motor 104 which causes the optical disc 100 to rotate. A feed motor 105 is provided in order to cause the optical pick up 103 to move in the radial direction of the optical disc 100.

A Blu-ray Disc (BD (registered trademark)), for example, may be used as the optical disc 100. A BD is a high-density optical disc having a single sided-single layer recording capacity of approximately 25 gigabytes and a single sided-double layer recording capacity of approximately 50 gigabytes. In the BD standard, in order to make the beam spot diameter small, the light source wavelength is set to 405 nm, and the numerical aperture NA of the object lens is increased to 0.85. In the CD standard, the light source wavelength is 780 nm, NA is 0.45 and the spot diameter is 2.11 µm, and in the DVD standard, the light source wavelength is 650 nm, NA is 0.6 and the spot diameter is 1.32 µm. In the BD standard, it is possible to narrow the spot diameter to 0.58 µm.

In order to further increase the recording capacity, it is desirable that the optical disc employ a method that records data in both a groove track and a land track (referred to as a land/groove recording method, as appropriate). The track formed by the groove is referred to as a groove track. The groove is defined as the part irradiated with laser light when manufacturing the optical disc, the area interposed between adjacent grooves is referred to as a land, and the track formed by the land is referred to as a land track. Furthermore, if the BD is a multi-layer optical disc in which a plurality of information recording layers is arranged, the recording capacity may be further increased. The disclosure is not limited to the BD and may be applied with respect to these high-density optical discs.

Returning to FIG. 1, in the optical disc apparatus 101, the spindle motor 104 and the feed motor 105 are driven and controlled by a servo controller 107 which is controlled based on commands from a system controller 106.

The optical pick up 103 irradiates the recording surface of the optical disc 100 with a light beam, and detects the light beam reflected by the recording surface of the optical disc 100. The optical pick up 103 supplies signals corresponding to each light beam to a pre-amplifier 108 based on the light beam reflected from the recording surface of the optical disc 100.

Based on the output from the optical detector, the pre-amplifier 108 generates a focus error signal by an astigmatic method, and further generates a tracking error signal as described later. Furthermore, the pre-amplifier 108 generates an RF signal, and outputs the RF signal to a signal modulator and demodulator and ECC block 109. The pre-amplifier 108 outputs the focus error signal and the tracking error signal to the servo controller 107.

The signal modulator and demodulator and ECC block 109 subjects a digital signal input from an interface 110 or a D/A-A/D converter 111 to a recording process when performing recording of data with respect to the optical disc 100. For example, the signal modulator and demodulator and ECC block 109 performs error correction encoding and performs modulating processing, such as the 1-7PP format.

When recording data as compressed data, a compression and expansion portion may be provided between the signal modulator and demodulator and ECC block 109 and the interface 110 or the D/A-A/D converter 111. In this case, the data is compressed in formats such as MPEG2 (Moving Picture Experts Group Phase 2) or MPEG4.

The focus error signal and the tracking error signal from the pre-amplifier 108 are input to the servo controller 107. The servo controller 107 generates a focus servo signal and a tracking servo signal such that the focus error signal and the tracking errors signal become 0, and drives and controls an object lens driving portion, such as a two-axis actuator that drives the object lens, based on the servo signals. Furthermore, the servo controller 107 detects a synchronization signal and the like according to the output from the pre-amplifier 108 and controls the spindle motor 104 with a constant linear velocity (CLV) system or the like. The laser controller 112 controls the laser light source of the optical pick up 103. The laser controller 112 performs control that causes the output power of the laser light source to be different when in a recording mode and when in a reproduction mode.

The system controller 106 controls the overall apparatus. The system controller 106 controls the optical disc apparatus 101 based on address information or a table of contents (TOC) recorded in a premastered pit, groove or the like which is the innermost circumference of the optical disc, according to the operation input from the user. Here, the system controller 106 specifies the recording position and the reproduction position of the optical disc at which recording and reproduction are performed, and controls each portion based on the specified position.

The optical disc apparatus 101 configured as above operates the optical disc 100 to rotate with the spindle motor 104, and drives and controls the feed motor 105 according to the control signal from the servo controller 107. The optical disc apparatus 101 performs recording and reproduction of information with respect to the optical disc 100 by moving the optical pick up 103 to a position corresponding to a desired recording track on the optical disc 100.

More specifically, during recording or reproducing with the optical disc apparatus 101, the servo controller 107 causes the optical disc 100 to rotate, detects the light beam returning from the optical disc 100 with the light detector by the optical pick up 103 irradiating the light beam from the light source, and generates a focus error signal and a tracking error signal. The optical pick up 103 performs focus servo and tracking servo by driving the object lens with an object lens driving mechanism based on the focus error signal and the tracking error signal.

When recording with the optical disc apparatus 101, a signal from an external computer 113 is input to the signal modulator and demodulator and ECC block 109 via the interface 110. The signal modulator and demodulator and ECC block 109 performs error correction encoding with respect to digital data input from the interface 110 or the D/A-A/D converter 111, and further generates a recording signal after performing modulating processing. The laser controller 112 controls the laser light source of the optical pick up 103 and records the information on the optical disc 100 based on the recording signal generated by the signal modulator and demodulator and ECC block 109.

When reproducing information recorded on the optical disc 100 with the optical disc apparatus 101, the signal modulator and demodulator and ECC block 109 performed demodulating processing with respect to the signals detected by the light detector. If the recording signal demodulated by the signal modulator and demodulator and ECC block 109 is for the computer data storage, the signal is output to the external computer 113 via the interface 110. In so doing, the external computer 113 is able to operate based on the signal recorded on the optical disc 100.

If the recording signal demodulated by the signal modulator and demodulator and ECC block 109 is for audio-visual, the signal is subjected to digital-analog conversion by the D/A-A/D converter 111, and supplied to an audio-visual processor 114. Audio-visual processing is performed by the audio-visual processor 114, and the resultant signal is output to an external speaker or monitor not shown in the drawings via an audio-visual signal input and output portion 115.

Optical Pick Up

Next, the optical pick up 103 used in the above-described optical disc apparatus will be described using FIG. 2. The optical pick up 103 includes, for example, a laser diode (LD) 1 that outputs laser light (beam) with a wavelength of 405 nm. Using the laser light, information is recorded on the optical disc 100, and information is reproduced from the optical disc 100.

After the laser light is converted to parallel light by a collimator lens 2, the light is reflected 90° to the optical disc 100 side by a polarizing beam splitter (PBS) 3, and is emitted to the optical disc 100 through the object lens 4. The object lens 4 is supported to be displaceable in the tracking direction and the focus direction.

Laser light reflected by the optical disc 100 enters a polarizing beam splitter 3 through the object lens 4, and is emitted onto a detector 6 by passing through the polarizing beam splitter 3 and a mask 5 as a light attenuating member. The laser light is converted to an electrical signal by the detector 6.

Figure 2:
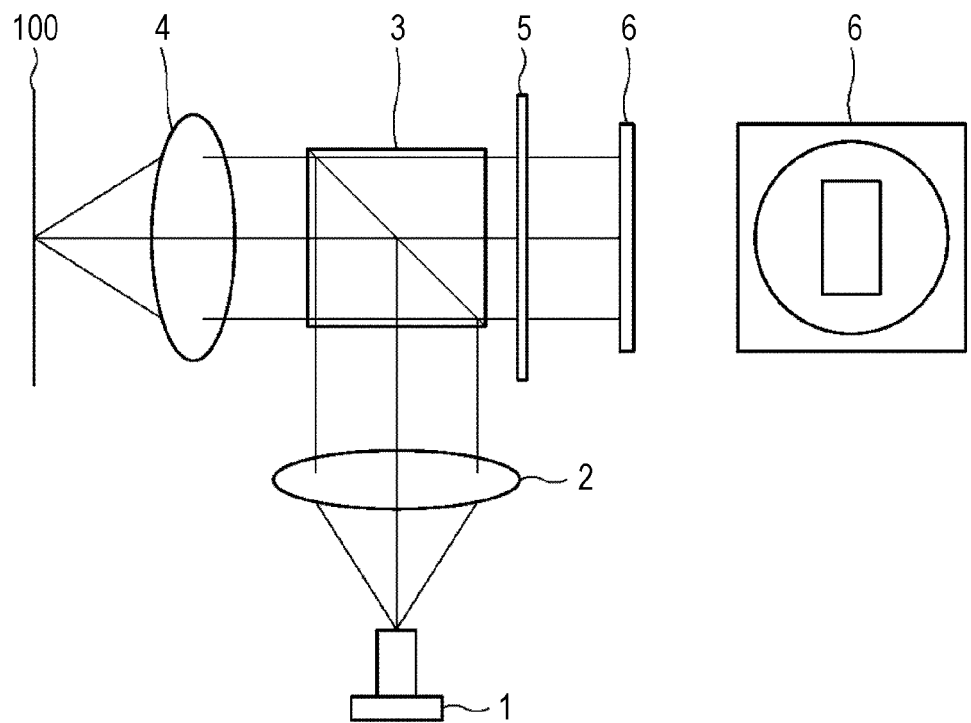
FIG. 2 is a schematic diagram showing a configuration of an optical pick up in the first embodiment of the disclosure.

The configuration of the optical pick up 103 in FIG. 2 shows the minimum of constituent elements for illustrating the disclosure, and a cylindrical lens not shown in the drawings is provided for applying a predetermined astigmatism. Furthermore, the detector 6 is divided into four regions for detecting the focus error signal and the tracking error signal. By operating the output signal for each region of the detector 6, the main data signal, the tracking error signal and the focus error signal are calculated. Furthermore, a condenser lens may be arranged between the mask 5 and the detector 6.

Example of Mask

Figure 3:
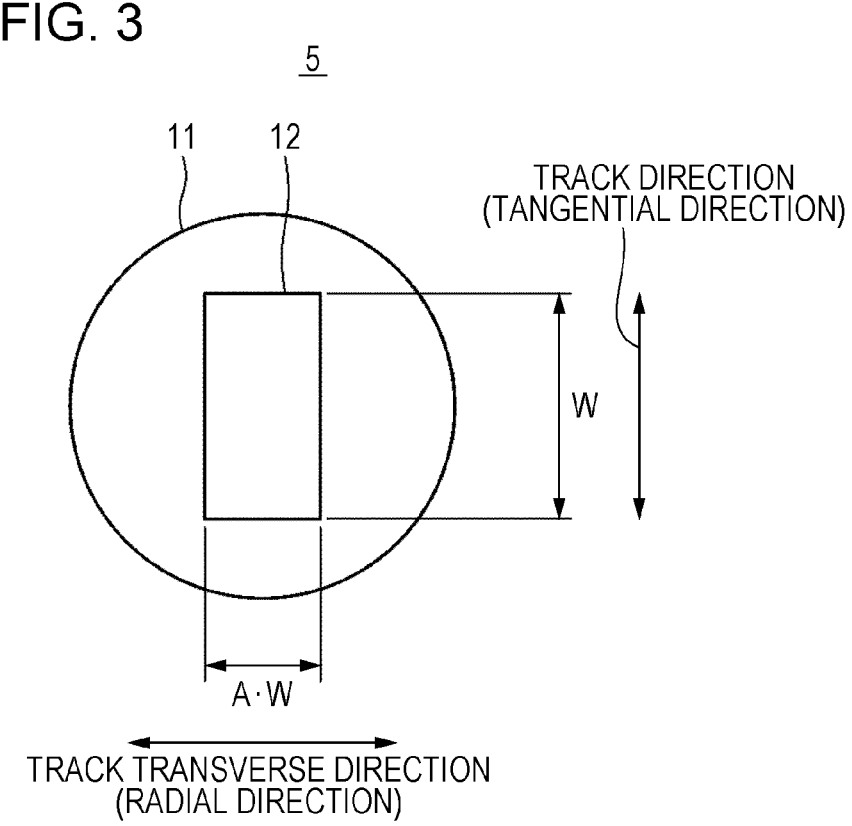
FIG. 3 is a schematic diagram used in the description of a mask in the first embodiment.

FIG. 3 shows an example of the mask 5. A beam diameter 11 at the arrangement position of the mask 5 appears as round in FIG. 3. The shape of the beam diameter 11 is formed according to the shape of the pupil of the object lens 4. The light blocking portion 12 as a second region is formed in the center portion of the beam diameter 11. The region other than the light blocking portion 12 in the region of the beam diameter 11 is a first region.

The light blocking portion 12 is rectangular or is elliptical or a similar shape in which the track direction (below, referred to as the tangential direction, as appropriate), for example, is set as the longitudinal direction. The long side of the rectangle is shorter than the beam diameter 11. That is, the beam diameter 11 is not isolated by the light blocking portion 12.

The tangential direction of the light blocking portion 12 is the vertical direction, and the track transverse direction (below, referred to as the radial direction, as appropriate) is horizontal. If the vertical length is W, and the aspect ratio is A (=horizontal/vertical), the horizontal length is A·W. A case in which the aspect ratio A is 1 signifies that the shape of the light blocking portion 12 is a square, and a case in which the aspect ratio A is greater than 1 signifies that the horizontal length is longer than the vertical length. In the disclosure, the preferred aspect ratio A of the light blocking portion 12 is less than 1. A case representing the shape of the light blocking portion 12 is denoted by (W, A). For example, the notation (0.5, 0.5) represents W=0.5 and A=0.5. The horizontal length in this case is 0.25.

Effect of Mask

Figure 4:
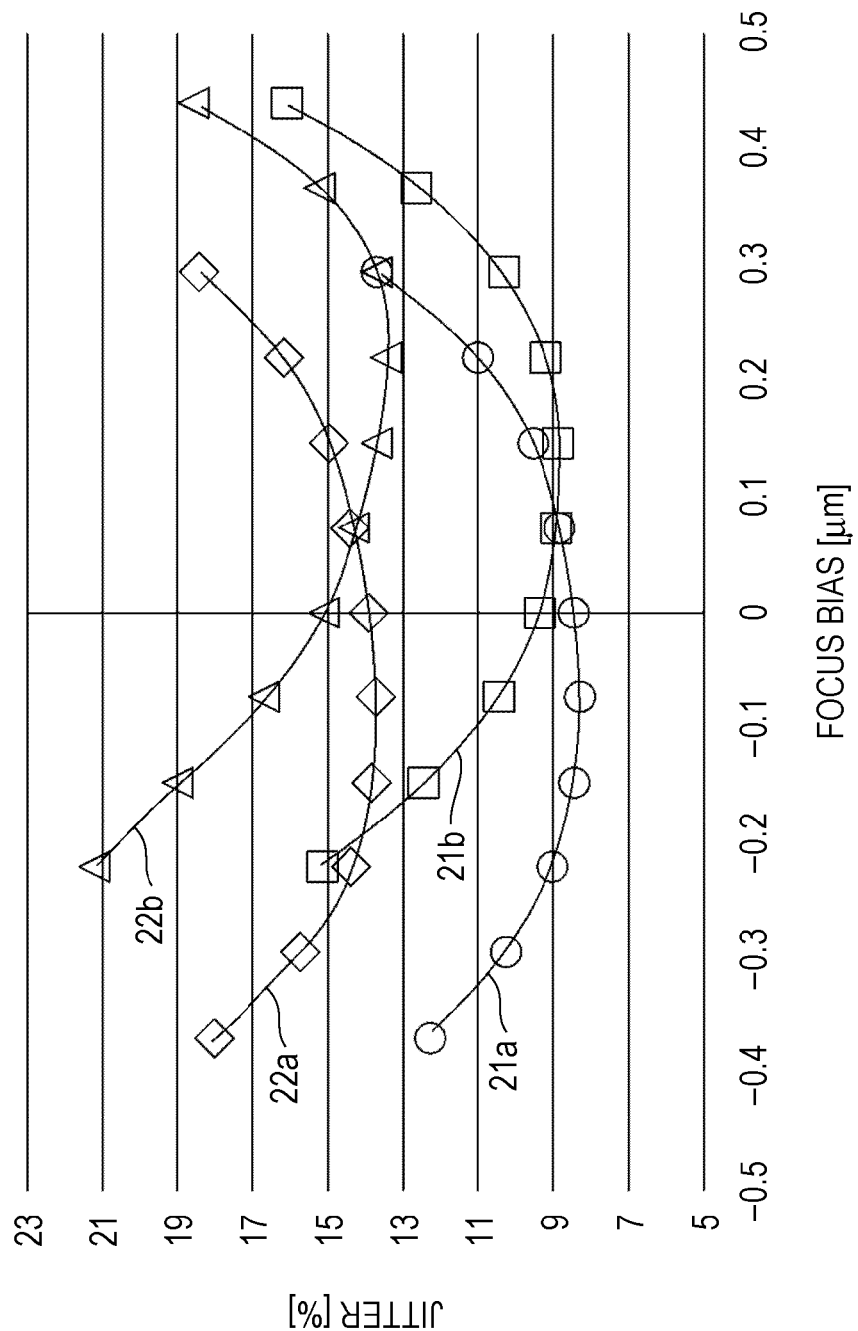
FIG. 4 is an example of a graph for illustrating the effect of the disclosure.
Figure 5:
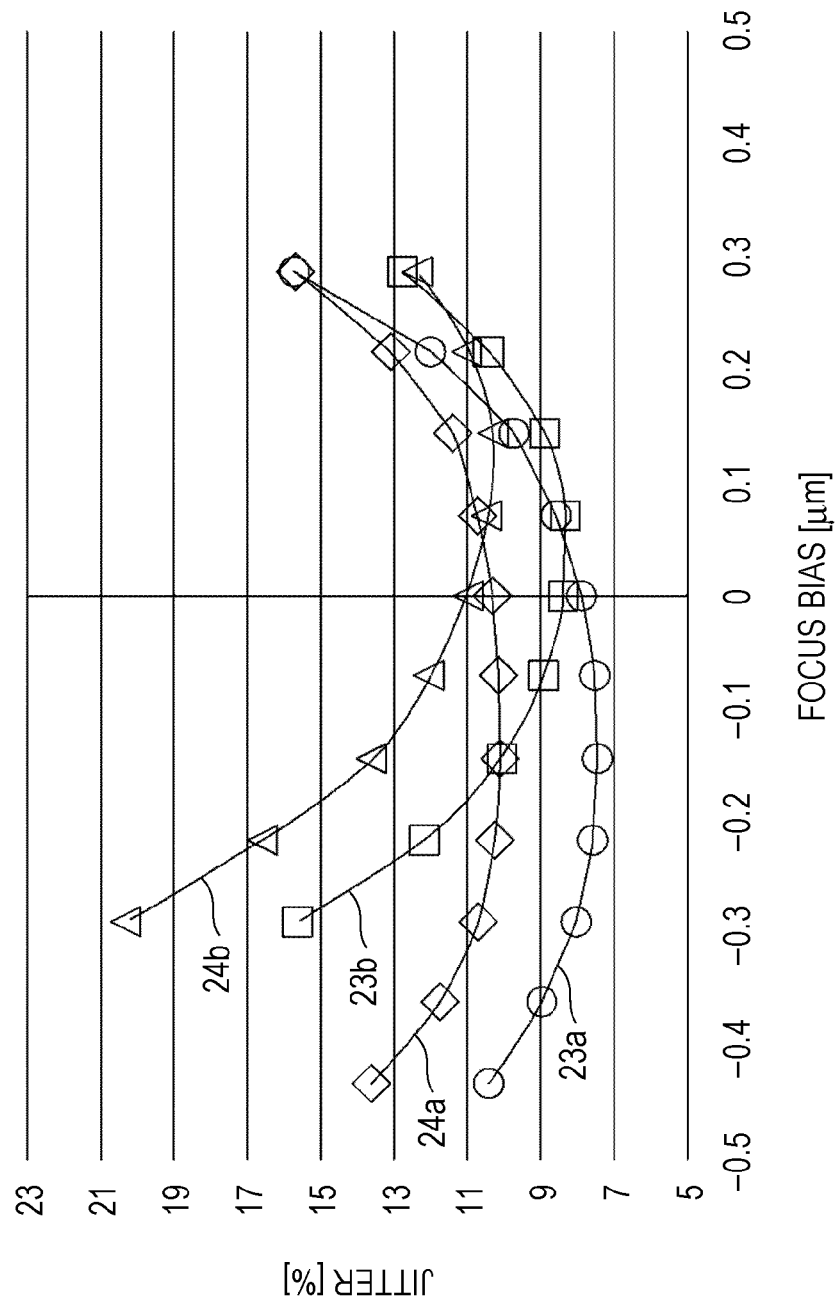
FIG. 5 is another example of a graph for illustrating the effect of the disclosure.

FIGS. 4 and 5 are graphs for illustrating the crosstalk lowering effect of the disclosure, and the horizontal axis is the focus bias (μm) and the vertical axis is the evaluated value, for example, jitter (%). Evaluated value other than jitter, for example, the error rate, may be used. The focus bias is a value that provides an offset with respect to a focal position of the laser light. In an actual disc reproducing apparatus, there are cases in which when the level of the focus error signal is 0, the best concentration state is not achieved. Therefore, the target value of the focus error signal level is set so as to be the focus bias. The wavelength λ, and the NA of the object lens 4 as measurement conditions are set the same value as the case of the BD. Furthermore, the optical disc 100 is used in which recording is performed on both the land and the groove, and measurement is performed by reproducing the recorded portions.

FIG. 4 shows the measurement results of a case in which the track pitch Tp is 0.45 μm. Graphs 21a and 21b in FIG. 4 show the characteristics in a case of having the mask 5, and graphs 22a and 22b show the characteristics of a case of not having the mask 5, that is, of an existing reproducing apparatus. The graphs 21a and 22a show the characteristics during reproduction on the land track, and the graphs 21b and 22b show the characteristics during reproduction on the groove track.

As understood from FIG. 4, the first embodiment of the disclosure is able to keep jitter during reproduction on the land track to 9% or lower, and the jitter during reproduction on the groove track to approximately 9%. In contrast, in an existing reproducing apparatus, the jitter during reproduction on the land track is 13% or higher, and the jitter during reproduction on the groove track is 13% or higher. In this way, according to the first embodiment of the disclosure, it is possible to secure a larger reproduction margin compared to the existing reproducing apparatus.

FIG. 5 shows the measurement results of a case in which the track pitch Tp is 0.475 μm. Graphs 23a and 23b in FIG. 5 show the characteristics in a case of having the mask 5, and graphs 24a and 24b show the characteristics of a case of not having the mask 5, that is, of an existing reproducing apparatus. The graphs 23a and 24a show the characteristics during reproduction on the land track, and the graphs 23b and 24b show the characteristics during reproduction on the groove track.

As understood from FIG. 5, the first embodiment of the disclosure is able to keep jitter during reproduction on the land track to 8% or lower, and the jitter during reproduction on the groove track to 9% or lower. In contrast, in the existing reproducing apparatus, the jitter during reproduction on the land track is approximately 10%, and the jitter during reproduction on the groove track is 10% or higher. In this way, according to the first embodiment of the disclosure, it is possible to secure a larger reproduction margin compared to the existing reproducing apparatus.

The size of the beam spot on the recording surface of the optical disc 100 is generally represented by the formula below. λ is the wavelength of the laser light used, and NA is the numerical aperture of the object lens 4.

Spot diameter (φ)=1.22×λ/NA

When the pitch (d) between marks is narrower than a half value of the above formula, crosstalk exerts an influence. For example, in a case in which (λ=405 nm, NA=0.85) d=290 nm, and when the track pitch is smaller than this value, the crosstalk increases. In the case of the BD, the track pitch is 320 nm.

Figure 6A:
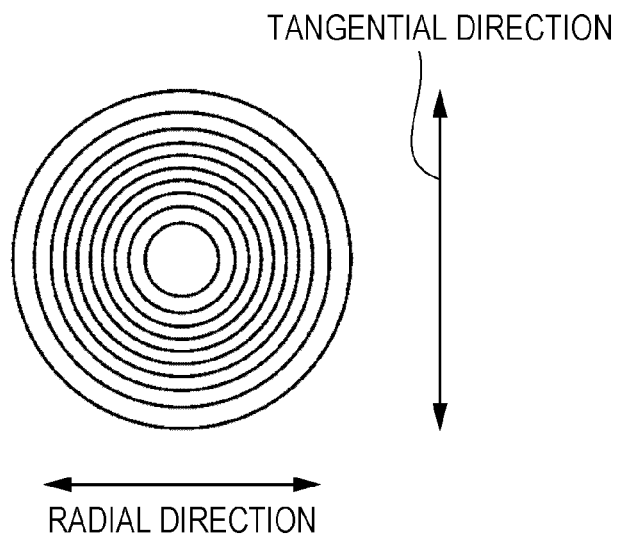
FIGS. 6A and 6B are schematic diagrams for illustrating the effect of the disclosure.
Figure 6B:
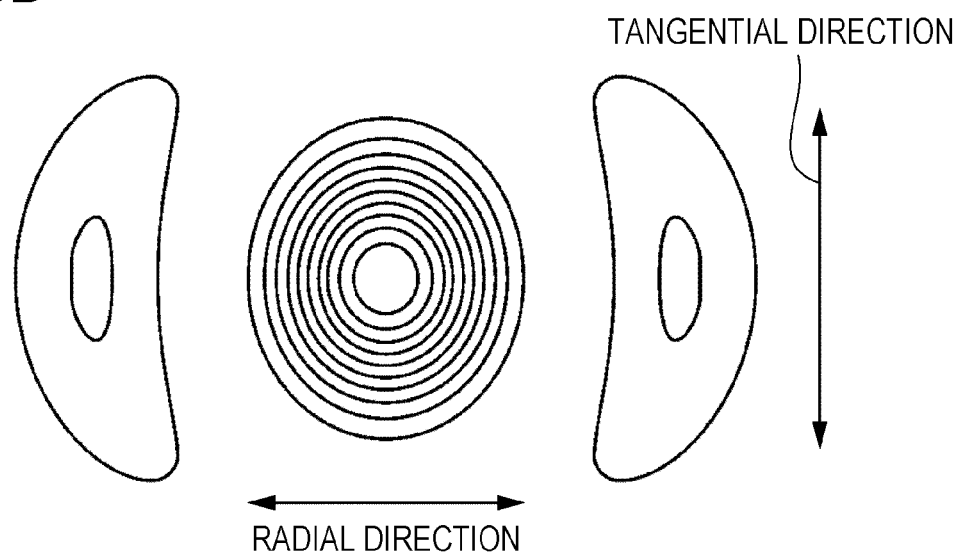

The calculation results of contours of the light intensity on the focal surface on which the beam is concentrated after passing through the mask 5 are shown in FIGS. 6A and 6B. FIG. 6A shows a case in which there is no mask 5, and FIG. 6B shows a case in which there is the mask 5. The light intensity of the spot is shown by the same lines as the contours. The intensity of the region surrounded by the line closest to the center is the maximum, and the intensity gradually lowers towards the outside of the spot. Since the longitudinal direction of the mask 5 is set to the tangential direction, for example, (W, A)=(0.6, 0.33). Because the light is blocked in a state in which the shape of the mask is optically subjected to a Fourier transform, a shape in which the beam is narrowed in the radial direction is attained. In a case in which only light of the mask shape is concentrated, the beam becomes larger in the radial direction on the focal surface. Conversely, since the light is blocked, the beam narrows in the radial direction. The crosstalk component is canceled by this action occurring in the reflected light source from the recording surface of the disc and blocking the light (noise component) applied to the adjacent track to the spot on the recording surface.

Figure 7A:
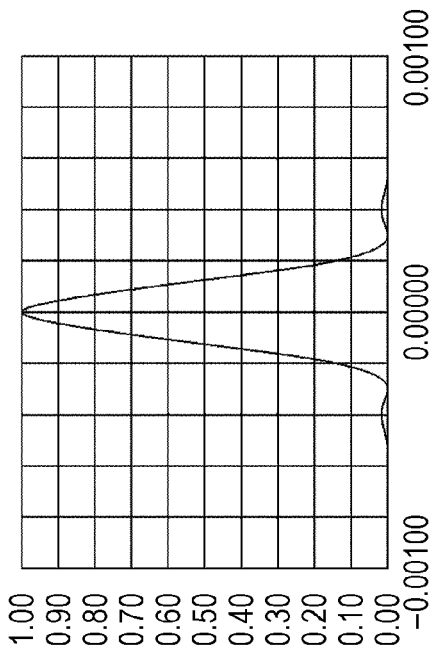
FIGS. 7A to 7D are schematic diagrams for illustrating the effect of the disclosure.
Figure 7B:
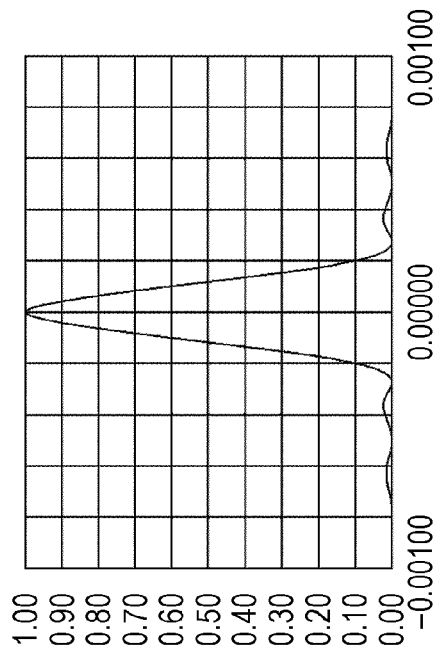
Figure 7C:
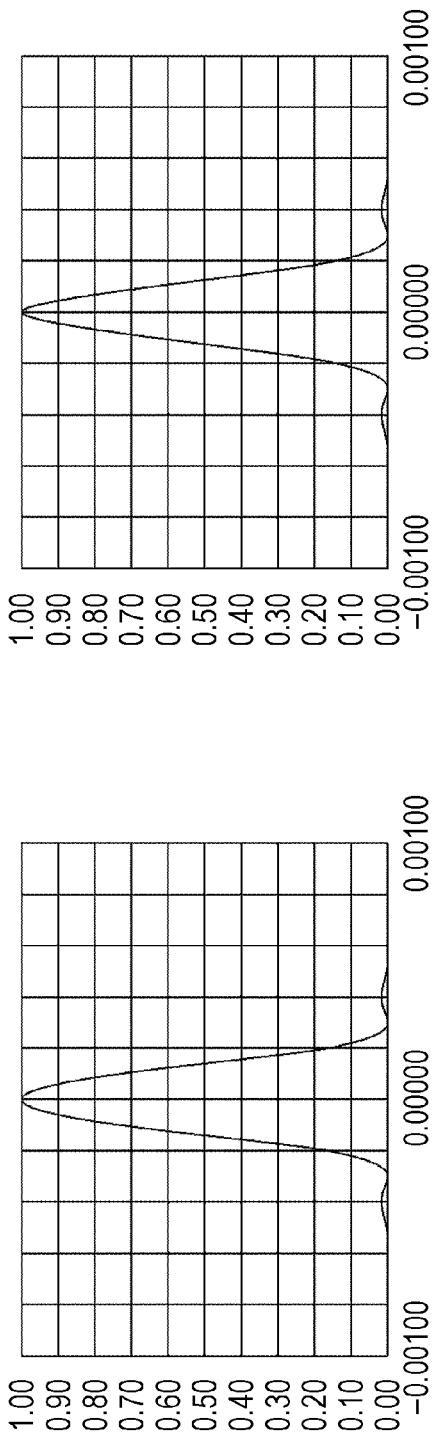
Figure 7D:
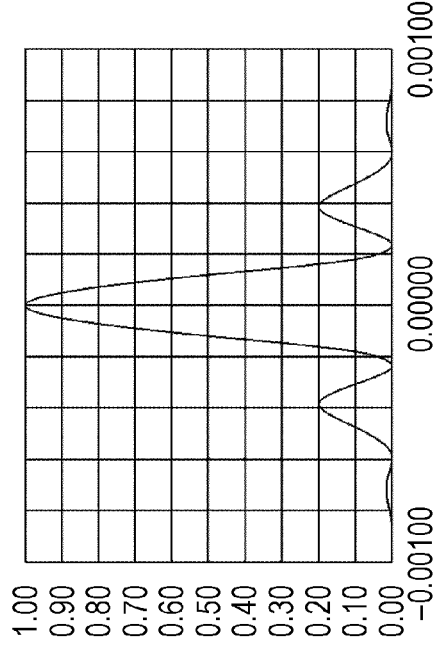

FIGS. 7A to 7D show the intensity distribution on the orthogonal two lines of the tangential direction and the radial direction orthogonal that pass through the center of the spot shown in FIGS. 6A and 6B. The horizontal axis in FIGS. 7A to 7D shows the dimensions in units of [μm], and the vertical axis shows values standardized at the maximum value. The horizontal axis and the vertical axis in the intensity distribution described later show the same values. FIGS. 7A and 7B show an intensity distribution in the radial direction and the tangential direction in a case in which the mask 5 is not provided. Since the spot in a case in which the mask is not provided is round, a distribution curve with approximately the same width is obtained with respect to both directions. As shown in FIGS. 7C and 7D, in a case in which the mask 5 is provided, FIGS. 7B and 7D become curves of the same intensity distribution with respect to the tangential direction. With respect to the radial direction, as shown in FIG. 7C, a narrower intensity distribution curve with respect to FIG. 7A is attained.

In the configuration of the optical pick up in FIG. 2, the mask 5 is arranged in front of the detector 6, and a portion of the reflected light (returning light) from the recording surface of the optical disc 100 is blocked. However, the mask may be arranged in the incident light path between the laser diode 1 and the recording surface of the optical disc 100. In this case, the shape of the spot on the recording surface is directly influenced, and for example, problems, such as a side lobe of the beam becoming stronger increasing the amount of mark of the adjacent track being read arise. Accordingly, it is preferable that the mask be inserted in the optical path of the returning light.

Figure 8:
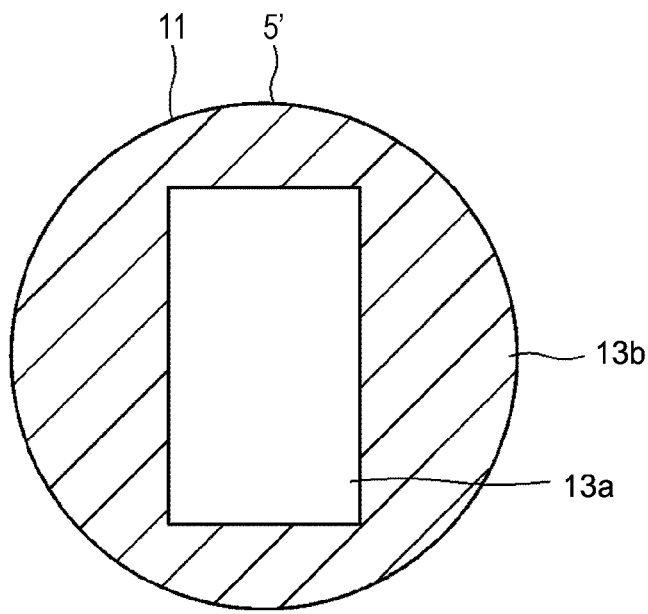
FIG. 8 is a schematic diagram showing a mask in which a transmissive portion and a light blocking portion are inverted.
Figure 9:
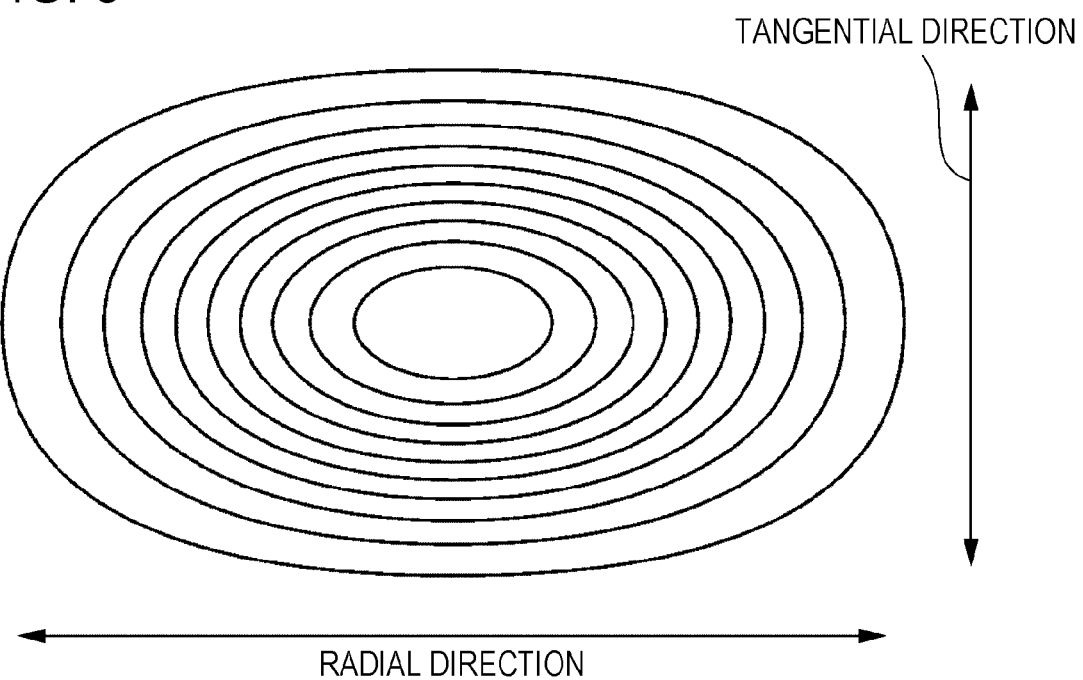
FIG. 9 is a schematic diagram that provides a description of a beam spot in a case in which the mask in FIG. 8 is used.
Figure 10A:
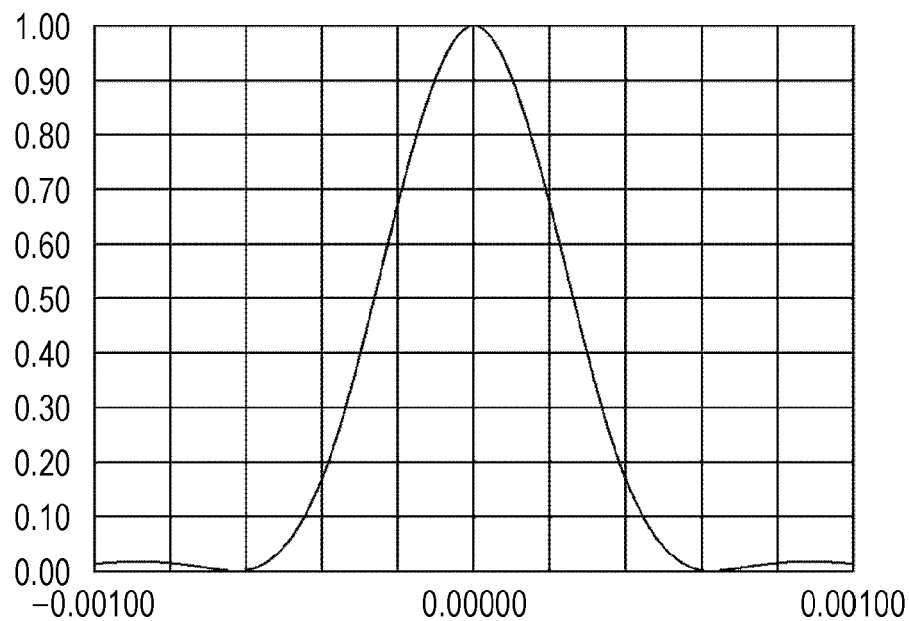
FIGS. 10A and 10B are schematic diagrams that provide a description of a beam spot in a case in which the mask in FIG. 8 is used.

FIG. 8 shows a mask 5' in which a rectangular region is set as a transmissive region 13a, and other regions are set as a light blocking region 13b in the beam diameter 11. That is, the mask 5' reverses the relationship between the transmissive region and the light blocking region of the above-described mask 5. In a case in which the mask 5' is arranged in the optical path of the returning light similarly to the mask 5, the spot on the recording surface of the optical disc 100 becomes as shown in FIG. 9. Furthermore, the intensity distribution on the line of the radial direction passing through the center of the spot in FIG. 9 becomes as shown in FIG. 10A, and the intensity distribution on the line of the tangential direction becomes as shown in FIG. 10B.

Figure 10B:
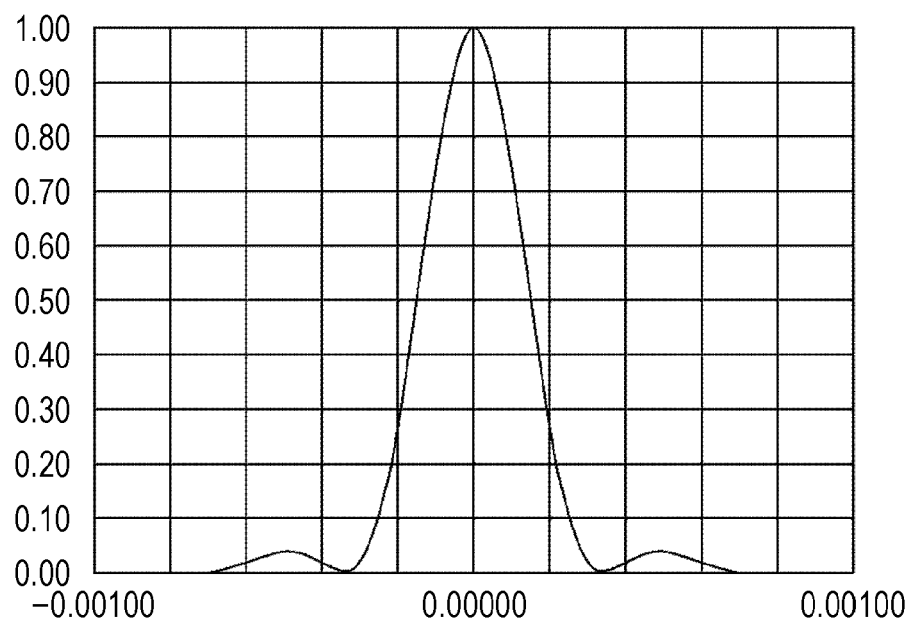

As understood from FIGS. 9 to 10B, in a case of mask 5' in which the light blocking portion and the transmissive portion have the opposite relationship to the mask 5, the width of the spot spreads in the radial direction. Accordingly, the central portion of the mask is understood as including more of the crosstalk components. Accordingly, by blocking the central portion of the returning light, an effect of lowering the crosstalk components is obtained.

Furthermore, the longitudinal direction of the mask 5 is set to be shorter than the diameter of the beam diameter. However, in a case in which the longitudinal direction of the mask 5 is the diameter or greater, the signal characteristics are lowered. This point will be described with reference to FIGS. 11A to 15B.

Figure 11A:
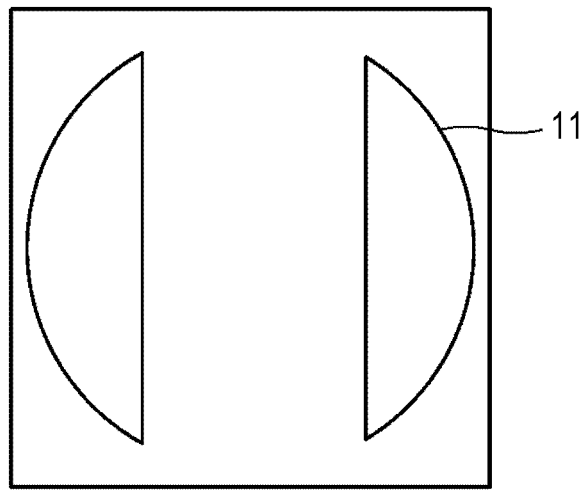
FIGS. 11A to 11C are schematic diagrams that show an example of a plurality of light blocking portions in a case in which the light blocking member is slit-shaped.
Figure 11B:
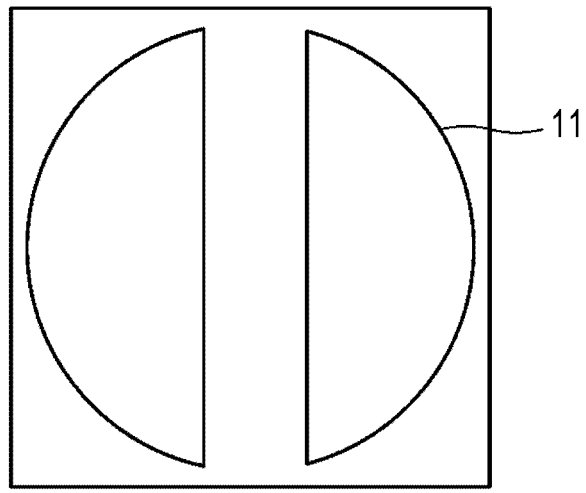
Figure 11C:
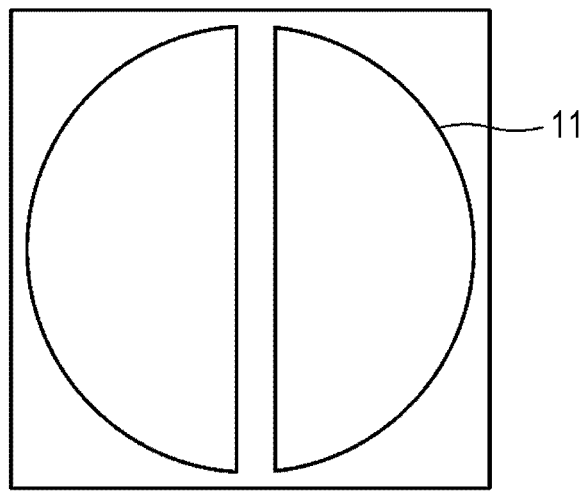
Figure 12A:
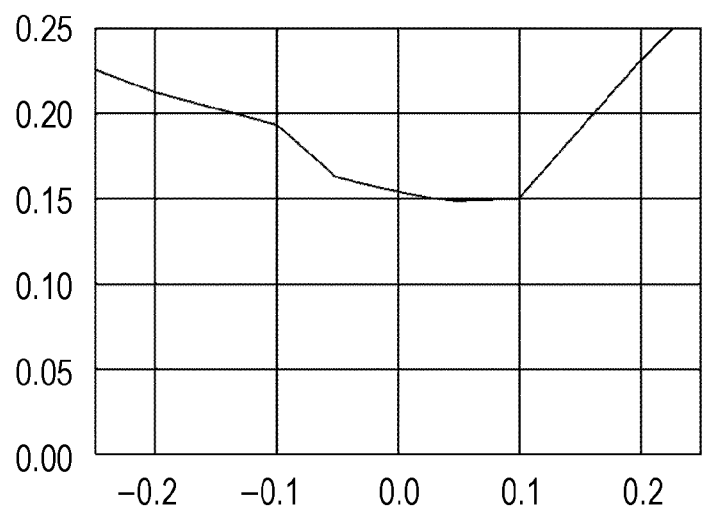
FIGS. 12A to 12C are graphs for illustrating the effect in a case in which a mask having the light blocking portion shown in FIGS. 11A to 11C is used.
Figure 12B:
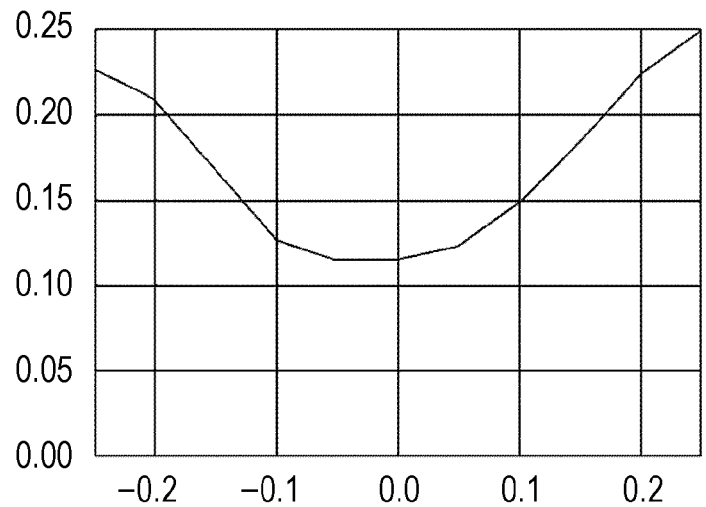
Figure 12C:
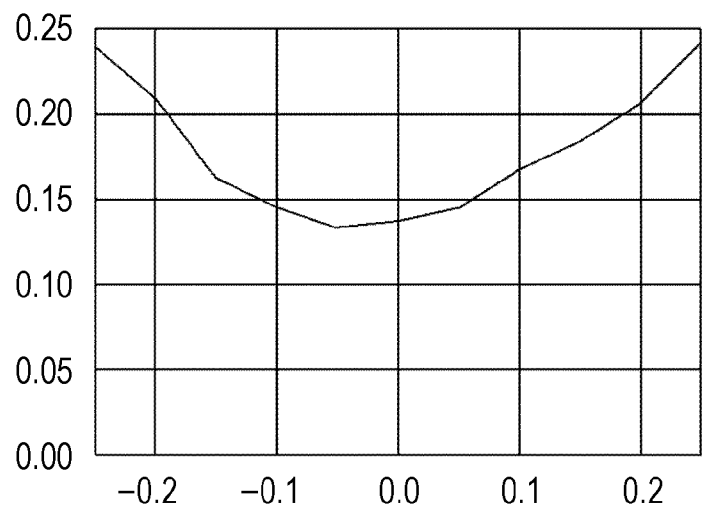

FIG. 11A is an example in which the light blocking portion has a slit shape because (W, A)=(1.0, 0.5), and the longitudinal direction is larger than the beam diameter 11. In FIGS. 11A to 11C, the vertical direction is the tangential direction, and the horizontal direction is the radial direction. When the jitter is calculated in a case in which a mask is used, the jitter is as shown in FIG. 12A. In FIGS. 12A to 12C, the horizontal axis is the value of the focus bias. As shown in FIG. 12A, the best jitter is 0.15 (15%). This value is clearly a worse value than the value of the jitter described with reference to FIG. 4 or FIG. 5.

FIG. 11B is an example in which the light blocking portion has a slit shape because (W, A)=(1.0, 0.25), and the longitudinal direction is larger than the beam diameter 11. When the jitter is calculated in a case in which a mask is used, the jitter is as shown in FIG. 12B. As shown in FIG. 12B, the best jitter is approximately 0.12 (12%). This value is a worse value than the value of the jitter described with reference to FIG. 4 or FIG. 5.

Figure 14:
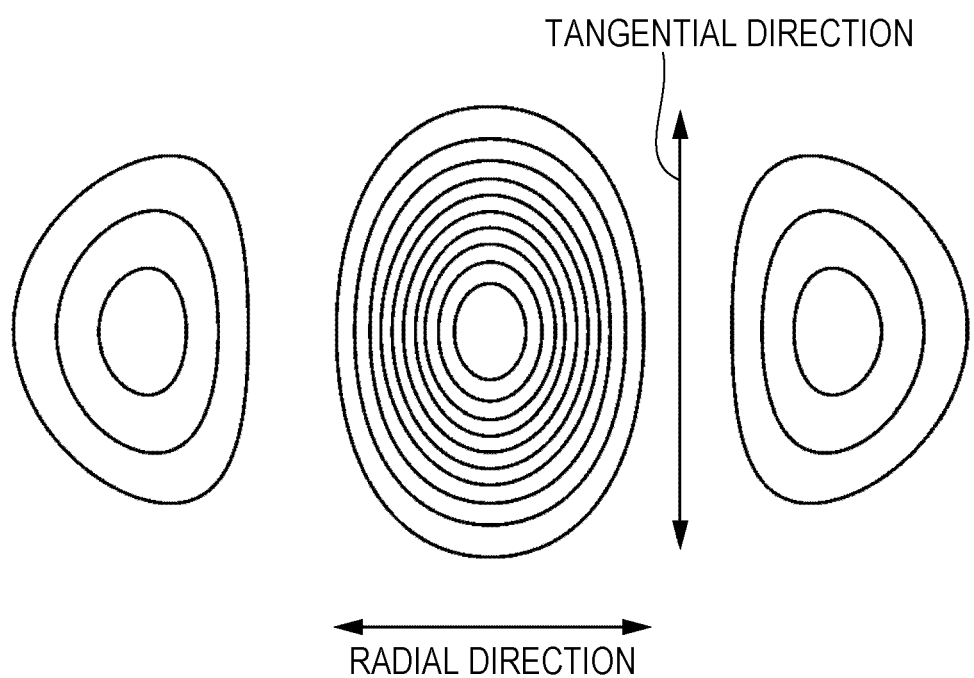
FIG. 14 is a schematic diagram for illustrating the shape of the beam spot.
Figure 15A:
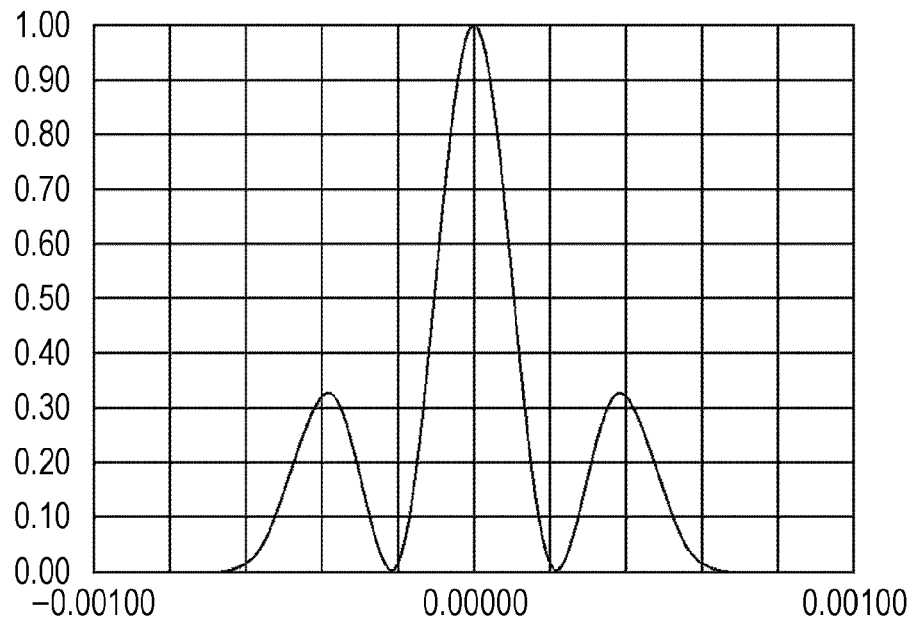
FIGS. 15A and 15B are graphs for illustrating the shape of the beam spot.
Figure 15B:
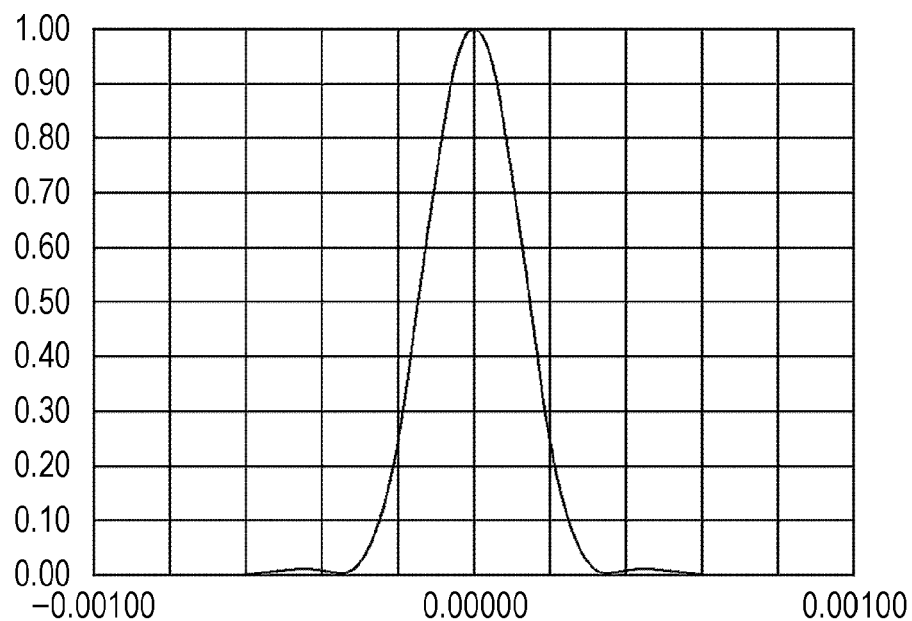

In a case in which the mask in FIG. 11B is used, the intensity distribution of the spot on the recording surface of the optical disc becomes as shown in FIG. 14. The intensity distribution on the line of the radial direction that passes through the center of the intensity distribution becomes as shown in FIG. 15A, and the intensity distribution on the line of the tangential direction that passes through the center becomes as shown in FIG. 15B. As shown in FIGS. 14 to 15B, the spot size in the tangential direction increases. As a result, the resolution of the spot is degraded and jitter is increased.

FIG. 11C is an example in which the light blocking portion has a slit shape because (W, A)=(1.0, 0.125), and the longitudinal direction is larger than the beam diameter 11. When the jitter is calculated in a case in which a mask is used, the jitter is as shown in FIG. 12C. As shown in FIG. 12C, the best jitter is approximately 0.13 (13%). This value is a worse value than the value of the jitter described with reference to FIG. 4 or FIG. 5.

Figure 13A:
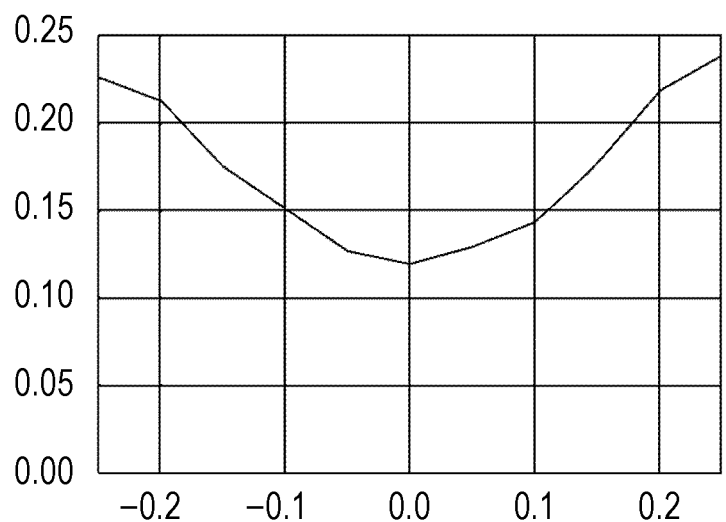
FIGS. 13A and 13B are graphs for illustrating the effect.

Furthermore, FIG. 13A shows the jitter in a case in which a mask in which the light blocking portion has a slit shape because (W, A)=(1.0, 0.375), and the longitudinal direction is larger than the beam diameter 11. As shown in FIG. 13A, the best jitter is approximately 0.12 (12%). This value is a worse value than the value of the jitter described with reference to FIG. 4 or FIG. 5.

Figure 13B:
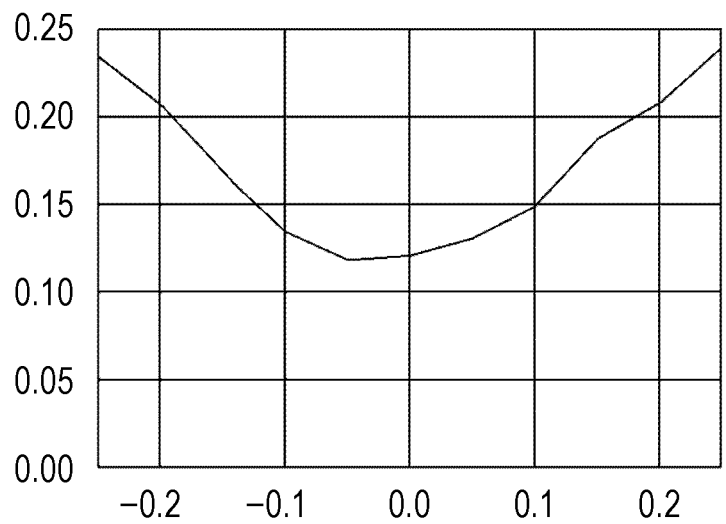

Furthermore, FIG. 13B shows the jitter in a case in which a mask in which the light blocking portion has a slit shape because (W, A)=(1.0, 0.1875), and the longitudinal direction is larger than the beam diameter 11. As shown in FIG. 13B, the best jitter is approximately 0.12 (12%). This value is a worse value than the value of the jitter described with reference to FIG. 4 or FIG. 5. As described above, in a case in which the longitudinal direction is greater than the beam diameter 11, it is difficult to reduce the jitter compared to the disclosure.

Modification Example of First Embodiment

Figure 16:
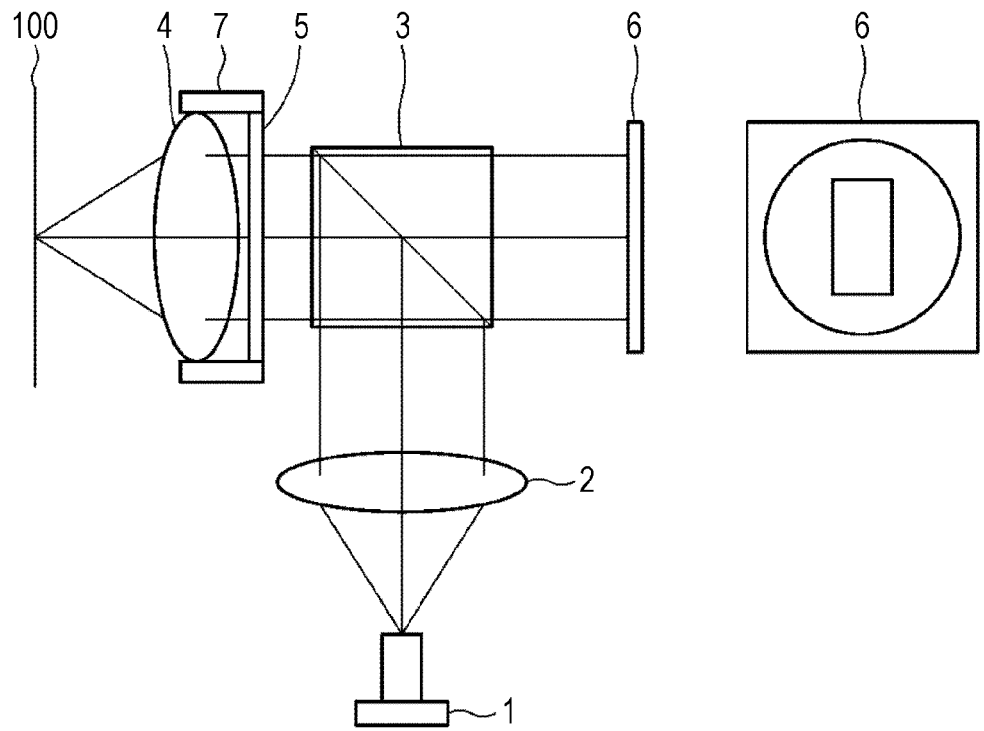
FIG. 16 is a schematic diagram showing a modification example of the first embodiment of the disclosure.

The position of the object lens 4 is displaced by the tracking servo. As a result, the object lens 4 moves relative to the mask 5, and there is concern of the quality of the reproduction signal degrading. In order to solve this problem, as shown in FIG. 16, the object lens 4 and the mask 5 are mechanically fixed by a linking member 7. By doing so, it is possible to the relative position of the object lens 4 and the mask 5 to not shift.

As the mask 5, for example, a diffraction element having a diffraction action with polarization dependency is used. The diffraction action of the mask 5 is set so as to work only with respect to the returning light from the recording surface of the optical disc 100. Light passing through the mask 5 due to the diffraction action may be separated and detected.

2. Second Embodiment

Figure 17:
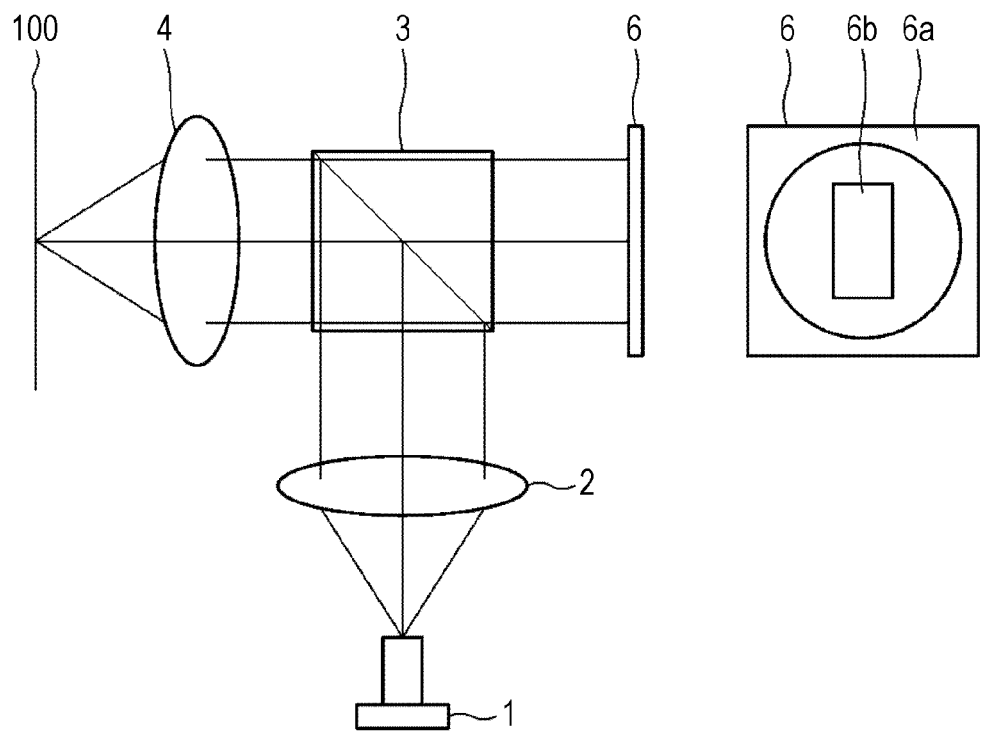
FIG. 17 is a schematic diagram showing a configuration of a second embodiment of the disclosure.

The second embodiment reduces the crosstalk by operating the detection signal of the detector 6, instead of providing a light blocking mask. As shown in FIG. 17, in the detection region of the detector 6, an electrical signal Sb is obtained by converting the amount of received light of the detection region 6b that corresponds to the light blocking portion 12 of the mask 5 in the first embodiment (refer to FIG. 3). Furthermore, in the detection region of the detector 6, an electrical signal Sa is obtained by converting the amount of received light of a detection region 6a other than a detection region 6b.

A detection signal Ss obtained from the detector 6 is obtained by the operation below.

$$Ss=Sa+kSb$$

Although the electrical signal Sa is obtained by converting the amount of received light of the detection region 6a, the amount of received light of the entire region of the detector 6 may be converted to the electrical signal Sa.

Figure 18:
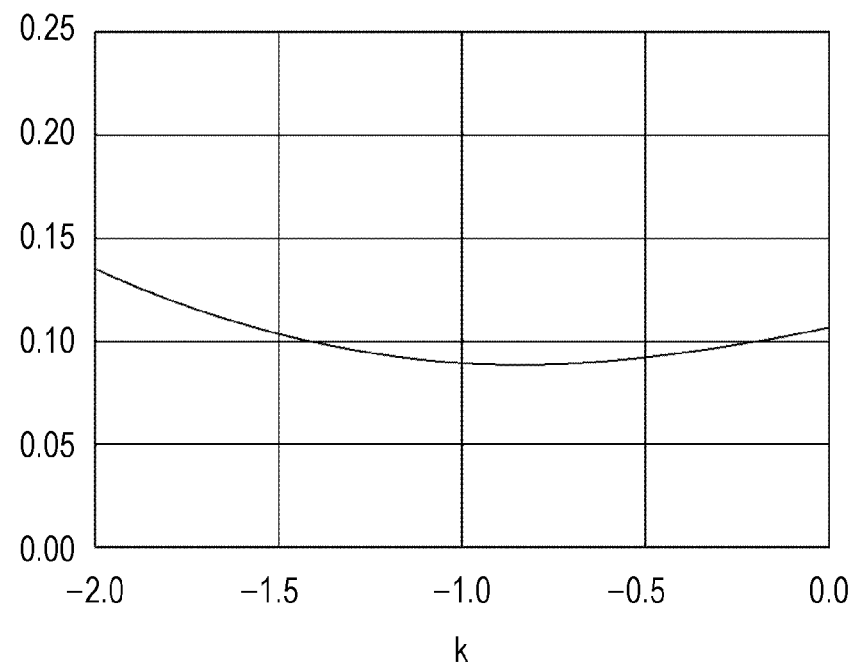
FIG. 18 is a graph for illustrating the effect of the second embodiment.
Figure 19:
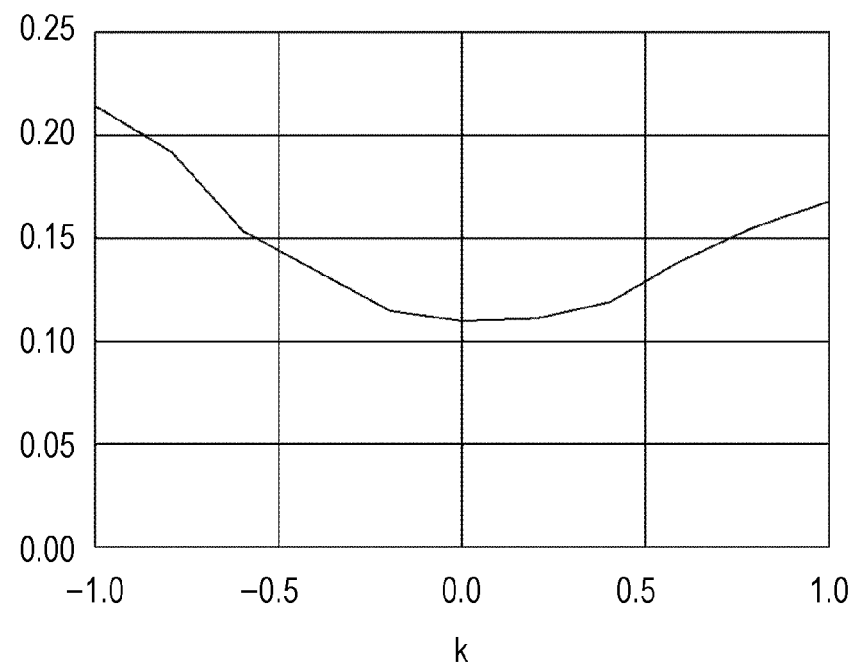
FIG. 19 is a graph for illustrating the effect of the second embodiment.

A coefficient k is set to a parameter exhibiting the quality of the reproduction signal, for example, so as to make the jitter the minimum. For example, the calculation results of a case in which (W, A) of the detection region 6b is (0.5, 0.5) is shown in FIG. 18. A case in which (k=−1.0) from FIG. 18 is able to reduce jitter to the minimum. For example, the calculation results of a case in which (W, A) of the detection region 6b is (0.5, 1) is shown in FIG. 19. A case in which (k=0.0) from FIG. 19 is able to reduce jitter to the minimum. In this case, a case in which nothing is subtracted at only the outside of the mask is best.

In the second embodiment, the mask 5 having a light blocking portion may be used therewith. Furthermore, a mask 5 including a semi transparent region which allows a small amount of light to pass therethrough without completely blocking the light may be used.

Figure 20:
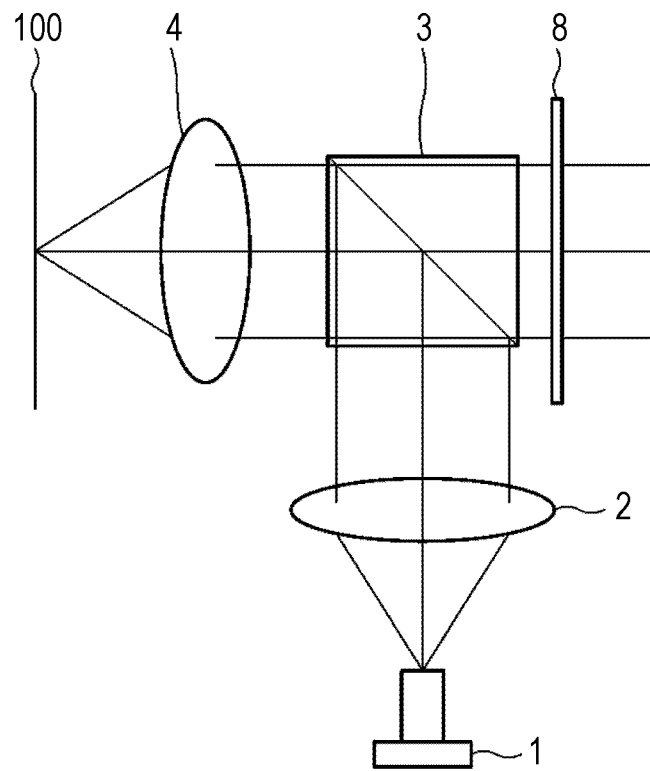
FIG. 20 is a schematic diagram for illustrating a modification example of the second embodiment.
Figure 21:
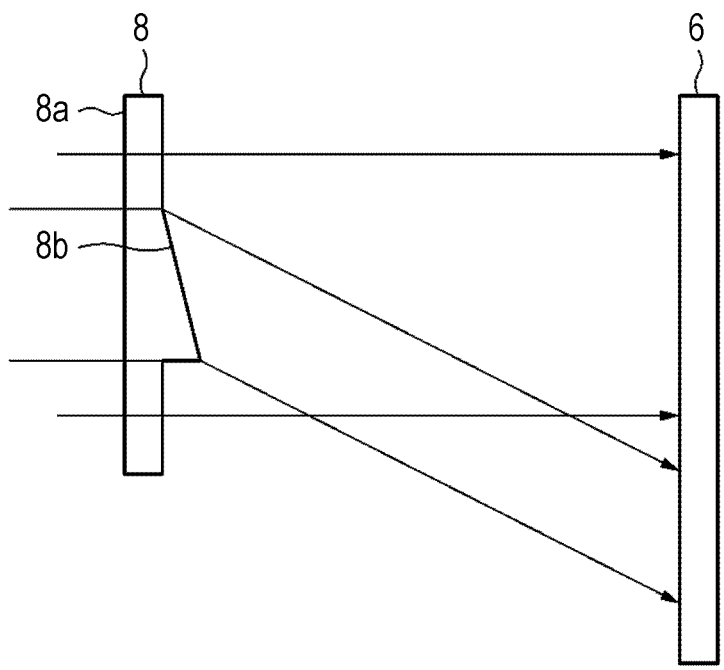
FIG. 21 is a schematic diagram for illustrating a modification example of the second embodiment that uses a prism.
Figure 22:
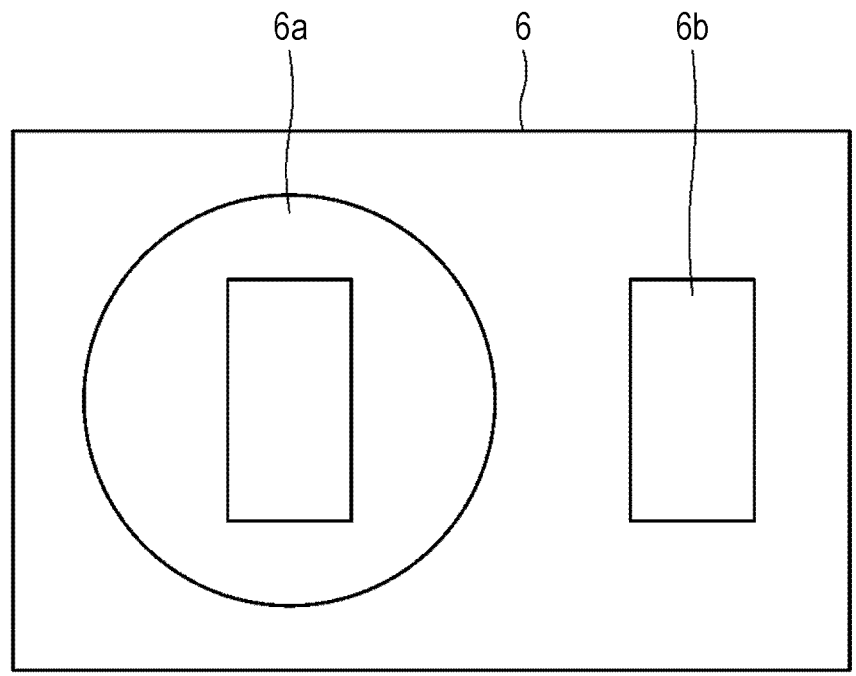
FIG. 22 is a schematic diagram for illustrating light detection in a modification example of the second embodiment.

As shown in FIG. 20, a prism 8 may be inserted on the optical path of returning light as a modification example of the second embodiment. The prism 8 is substantially plate-like, and has a refracting portion 8b as a position corresponding to the light blocking portion in the mask 5, as shown in FIG. 21. The portion other than the refracting portion 8b is formed as a transmissive portion 8a that laser light passes through. Accordingly, as shown in FIG. 22, in the detector 6, the detection region 6a that receives the light beam that passes through the transmissive portion 8a and the detection region 6b that receives the light that passes through the refracting portion 8b are formed to be isolated.

The detection signal Ss obtained from the detector 6, as described above, is obtained using the electrical signal Sa in which the amount of received light of the detection region 6a is converted and the electrical signal Sb in which the amount of received light of the detection region 6b is converted. The detection signal Ss thus obtained has the reduced crosstalk.

Figure 23:
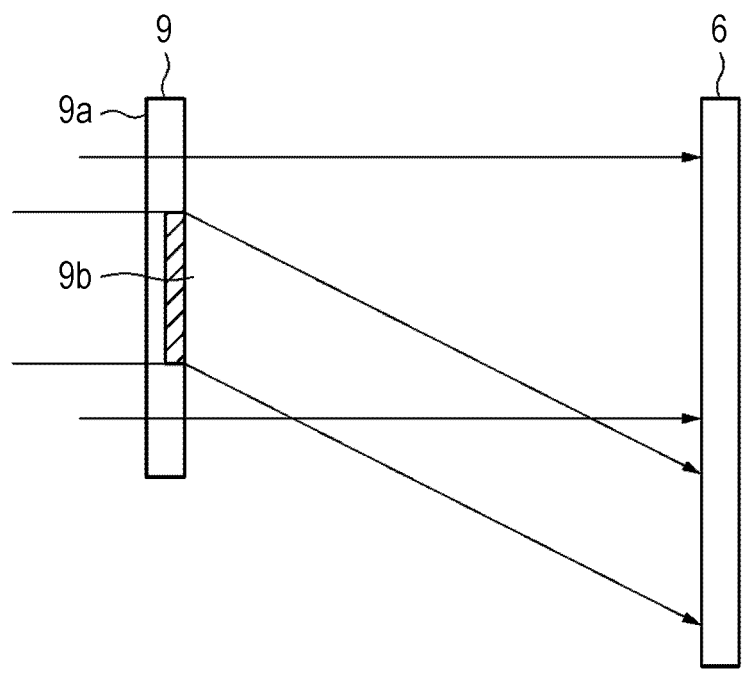
FIG. 23 is a schematic diagram for illustrating a modification example of the second embodiment in which a diffraction element is used.

Furthermore, as shown in FIG. 23, a diffraction element 9 may be inserted in the optical path of the returning light, as a further modification example of the second embodiment. The diffraction element 9 is substantially plate-like, and has a diffraction portion 9a at a position corresponding to the light blocking portion in the mask 5. The portion other than the diffraction portion 9a is formed as a transmissive portion 9b that laser light passes through. Accordingly, in the detector 6, the region that receives the light beam that passes through the transmissive portion 9b and the region that receives the light that passes through the diffraction portion 9a are formed to be isolated. Accordingly, it is possible to obtain a detection signal in which the crosstalk is reduced by operating the electrical signals obtained from these regions.

Similarly to the first embodiment, an optical path converting member, such as the prism 8 and the diffraction element 9, may be displaced integrally with the object lens 4.

Moreover, the disclosure may take the configurations as below.

(1) An optical medium reproducing apparatus that optically reproduces an optical medium on which a plurality of tracks is formed, in which, a beam returning from the optical medium is divided into a first region of an outside portion and a second region of an inside region, according to the shape of the pupil of an object lens, and crosstalk is reduced between tracks by using a first detection signal of the first region and a second detection signal of the second region.

(2) The optical medium reproducing apparatus according to (1) in which the second region is rectangular or is elliptical or a similar shape in which the track direction is set as the longitudinal direction, and the longitudinal direction is shorter than the beam diameter.

(3) The optical medium reproducing apparatus according to (1) or (2) in which crosstalk is reduced by subtracting the second detection signal from the first detection signal.

(4) The optical medium reproducing apparatus according to any of (1) to (3) in which a light attenuating member which causes light of the second region to be attenuated is arranged in the optical path passing through the object lens towards a detector.

(5) The optical medium reproducing apparatus according to (4) in which the light attenuating member is a light blocking member.

(6) The optical medium reproducing apparatus according to (4) in which the light attenuating member is formed to displace integrally with the object lens.

(7) The optical medium reproducing apparatus according to any of (1) to (6) in which a region that detects the second region is formed in a region that detects the first region on the detector.

(8) The optical medium reproducing apparatus according to any of (1) to (7) including an optical path converting member which is arranged in the optical path passing through the object lens toward the detector and by which the first region and the second region are isolated in the light receiving region of the detector.

(9) The optical medium reproducing apparatus according to (8) in which the optical path conversion member is formed to displace integrally with the object lens.

(10) An optical medium reproducing method that optically reproduces an optical medium on which a plurality of tracks is formed, the method including dividing a beam returning from the optical medium into a first region of an outside portion and a second region of an inside region, according to the shape of the pupil of an object lens, and reducing crosstalk between the tracks by using a first detection signal of the first region and a second detection signal of the second region.

3. Modification Example

Above, the embodiments of the disclosure have been described in detail; however, the disclosure is not limited to each of the above-described embodiments, and various modifications based on the technical idea of the disclosure are possible. For example, the wavelength of the laser light source may be a wavelength other than 405 nm. Furthermore, the disclosure may be applied with respect to an optical disc apparatus that performed only one of recording and reproduction with respect to an optical disc.

Further, the configurations, methods, processes, shapes, materials, and numerical values of the embodiments described above may be combined with one another within a range which does not depart from the gist of the disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical medium reproducing apparatus that optically reproduces an optical medium on which a plurality of tracks is formed, comprising:
    a single beam having a beam diameter and returning from the optical medium, and
    a detector, wherein:
    the single beam is divided into a first region and a second region, the second region corresponding to a center portion of the beam diameter, and the first region corresponding to a portion of the beam diameter outside the center portion,
    the detector generates a first detection signal corresponding to the first region and a second detection signal corresponding to the second region, and
    crosstalk between the tracks is reduced using only information from the single beam by subtracting the second detection signal from the first detection signal.

2. The optical medium reproducing apparatus according to claim 1, wherein:
    the second region has a shape in which a track direction is set as a longitudinal direction, and
    a length of the second region in the longitudinal direction is shorter than the beam diameter.

3. The optical medium reproducing apparatus according to claim 1,
    wherein a light attenuating member which causes light of the second region to be attenuated is arranged in an optical path passing through an object lens towards the detector.

4. The optical medium reproducing apparatus according to claim 3, wherein the light attenuating member and the object lens are mechanically fixed to each other.

5. The optical medium reproducing apparatus according to claim 3,
    wherein the light attenuating member is a light blocking member.

6. The optical medium reproducing apparatus according to claim 5, wherein the light blocking member is a diffraction element having a diffraction action with polarization dependency.

7. The optical medium reproducing apparatus according to claim 3,
    wherein the light attenuating member is formed to displace integrally with the object lens.

8. The optical medium reproducing apparatus according to claim 3,
    wherein a region that detects the second region is formed within a region that detects the first region on the detector.

9. The optical medium reproducing apparatus according to claim 1, comprising:
    an optical path converting member which is arranged in an optical path passing through an object lens toward the detector and by which the first region and the second region are isolated in a light receiving region of the detector.

10. The optical medium reproducing apparatus according to claim 9,
    wherein the optical path conversion member is formed to displace integrally with the object lens.

11. The optical medium reproducing apparatus according to claim 1, wherein the second region has a rectangular or elliptical shape.

12. The optical medium reproducing apparatus according to claim 1, wherein an aspect ratio of the second region is less than 1.

13. The optical medium reproducing apparatus according to claim 1, wherein a length of the second region in a longitudinal direction is less than the beam diameter.

14. The optical medium reproducing apparatus according to claim 1, wherein a prism is inserted into an optical path passing through an object lens toward the detector.

15. An optical medium reproducing method that optically reproduces an optical medium on which a plurality of tracks is formed, the method comprising:
    dividing a single beam having a beam diameter and returning from the optical medium into a first region and a second region, the second region corresponding to a center portion of the beam diameter, and the first region corresponding to a portion of the beam diameter outside the center portion;
    obtaining a first detection signal based on an amount of light received by a first region of a detector, the first region of the detector corresponding to the first region of the beam diameter;
    obtaining a second detection signal based on an amount of light received by a second region of the detector, the second region of the detector corresponding to the second region of the beam diameter; and reducing crosstalk between the tracks using only information from the single beam by subtracting the second detection signal from the first detection signal, wherein:

a shape of the beam is formed according to a shape of a pupil of an object lens.

16. The optical medium reproducing method according to claim 15, wherein:

the second region has a shape in which a track direction is set as a longitudinal direction, and a length of the second region in the longitudinal direction is shorter than the beam diameter.

17. The optical medium reproducing method according to claim 15, wherein the second region has a rectangular or elliptical shape.

18. The optical medium reproducing method according to claim 15, wherein an aspect ratio of the second region is less than 1.

19. The optical medium reproducing method according to claim 15, wherein a length of the second region in a longitudinal direction is less than the beam diameter.

20. The optical medium reproducing method according to claim 15, wherein a prism is inserted into an optical path passing through an object lens toward the detector.

21. The optical medium reproducing method according to claim 15, comprising:

providing an optical path converting member in an optical path passing through an object lens toward the detector, wherein the optical path converting member isolates the first region and the second region in a light receiving region of the detector.

22. The optical medium reproducing method according to claim 21, wherein the optical path conversion member is formed to displace integrally with the object lens.

23. The optical medium reproducing method according to claim 15, wherein a light attenuating member which causes light of the second region to be attenuated is arranged in an optical path passing through the object lens towards the detector.

24. The optical medium reproducing method according to claim 23, wherein the light attenuating member is formed to displace integrally with the object lens.

25. The optical medium reproducing method according to claim 23, wherein a region that detects the second region is formed within a region that detects the first region on the detector.

26. The optical medium reproducing method according to claim 23, wherein the light attenuating member and the object lens are mechanically fixed to each other.

27. The optical medium reproducing method according to claim 23, wherein the light attenuating member is a light blocking member.

28. An optical medium reproducing method that optically reproduces an optical medium on which a plurality of tracks is formed, the method comprising:

dividing a single beam having a beam diameter and returning from the optical medium into a first region and a second region, the second region corresponding to a center portion of the beam diameter, and the first region corresponding to a portion of the beam diameter outside the center portion;

obtaining a first detection signal based on an amount of light received by a first region of a detector, the first region of the detector corresponding to the first region of the beam diameter;

obtaining a second detection signal based on an amount of light received by a second region of the detector, the second region of the detector corresponding to the second region of the beam diameter; and reducing crosstalk between the tracks using only information from the single beam by blocking the center portion of the beam diameter and subtracting the second detection signal from the first detection signal, wherein:

a shape of the beam is formed according to a shape of a pupil of an object lens.

* * * * *